United States Patent [19]

Bowen et al.

[11] 4,166,700

[45] Sep. 4, 1979

[54] FILM THICKNESS DETECTOR

[75] Inventors: Howard Bowen, Wilmette; Dave Henderson, Mundelein; Steve Little, Northbrook, all of Ill.

[73] Assignee: Research Technology, Inc., Skokie, Ill.

[21] Appl. No.: 809,651

[22] Filed: Jun. 24, 1977

[51] Int. Cl.² .............................................. G01B 11/06
[52] U.S. Cl. ................................... 356/381; 250/560; 350/61
[58] Field of Search ................ 356/156, 167, 199–200, 356/120; 250/560, 571–572, 562–563, 223 R; 73/157; 350/61

[56] References Cited

U.S. PATENT DOCUMENTS

| | | | |
|---|---|---|---|
| 3,518,441 | 6/1970 | Selgin | 250/204 |
| 3,935,468 | 1/1976 | Bowen et al. | 250/572 |
| 4,013,367 | 3/1977 | Nagao et al. | 356/200 |

Primary Examiner—John K. Corbin
Assistant Examiner—Wm. H. Punter
Attorney, Agent, or Firm—Hill, Van Santen, Steadman, Chiara & Simpson

[57] ABSTRACT

A film thickness detector system has first and second thickness detector positions. The first position includes a light source for projecting a light beam to a light detector. A guide roller positions a film strip such that the light beam is tangent to a portion of the film strip supported by the guide roller. The film strip lies between the light source and light detector and the light beam is intercepted by a portion of the film strip at an angle with respect to the longitudinal axis of the film strip. As the thickness of the film strip intercepting a portion of the light beam varies, the output from the light detector varies in a corresponding manner. The output is amplified and may be used for stopping motion of the film. The second thickness detector position also has a light source and at least one light detector positioned to receive a light beam from the light source. A sensing member is positioned to ride on a surface of the film strip and an opaque member connected to the sensing member is provided having an edge portion which intercepts a portion of the light beam such that variations in film thickness correspond to variations in the light detector output. Such variations are then amplified and may be employed to stop the film.

3 Claims, 9 Drawing Figures

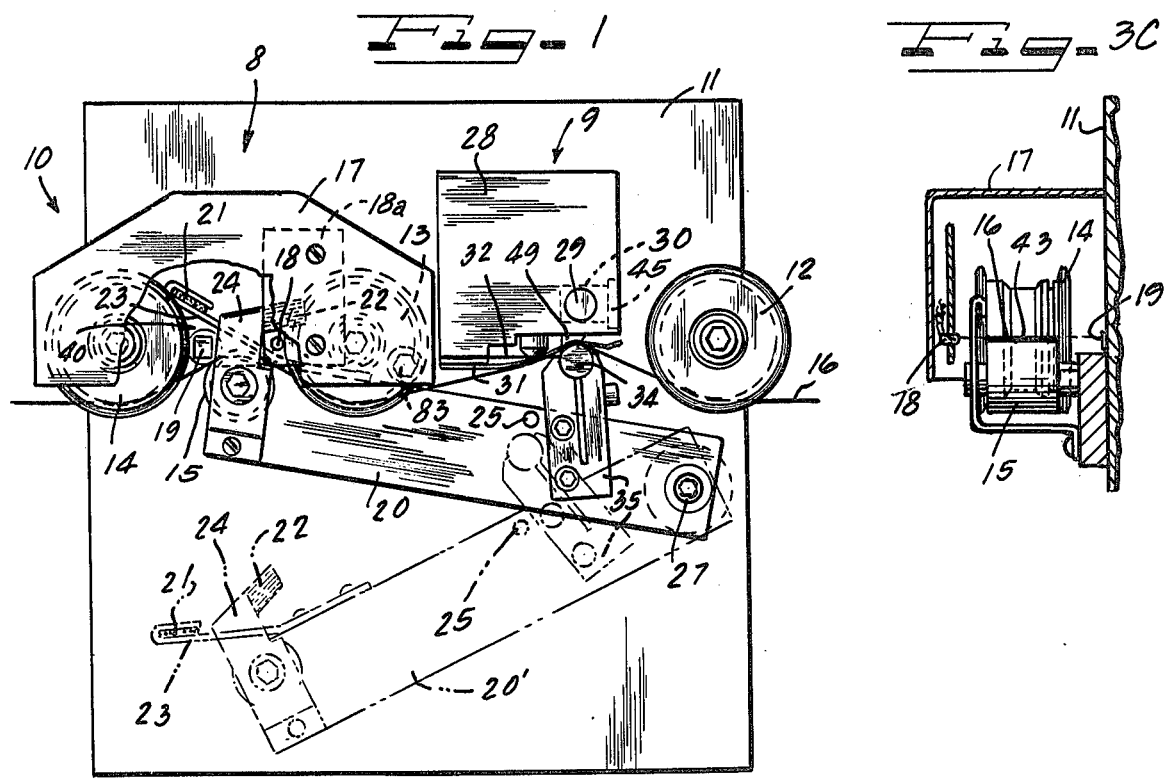
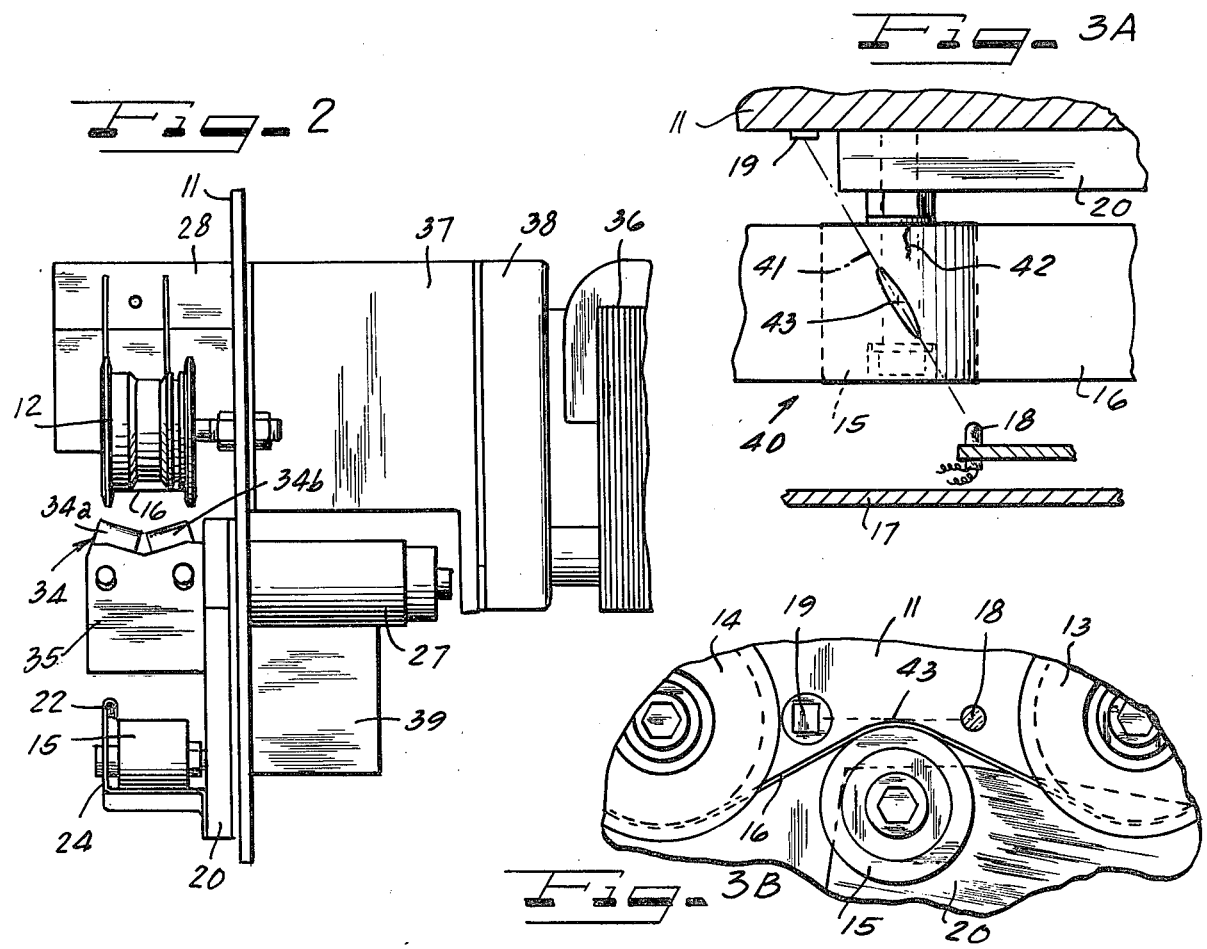

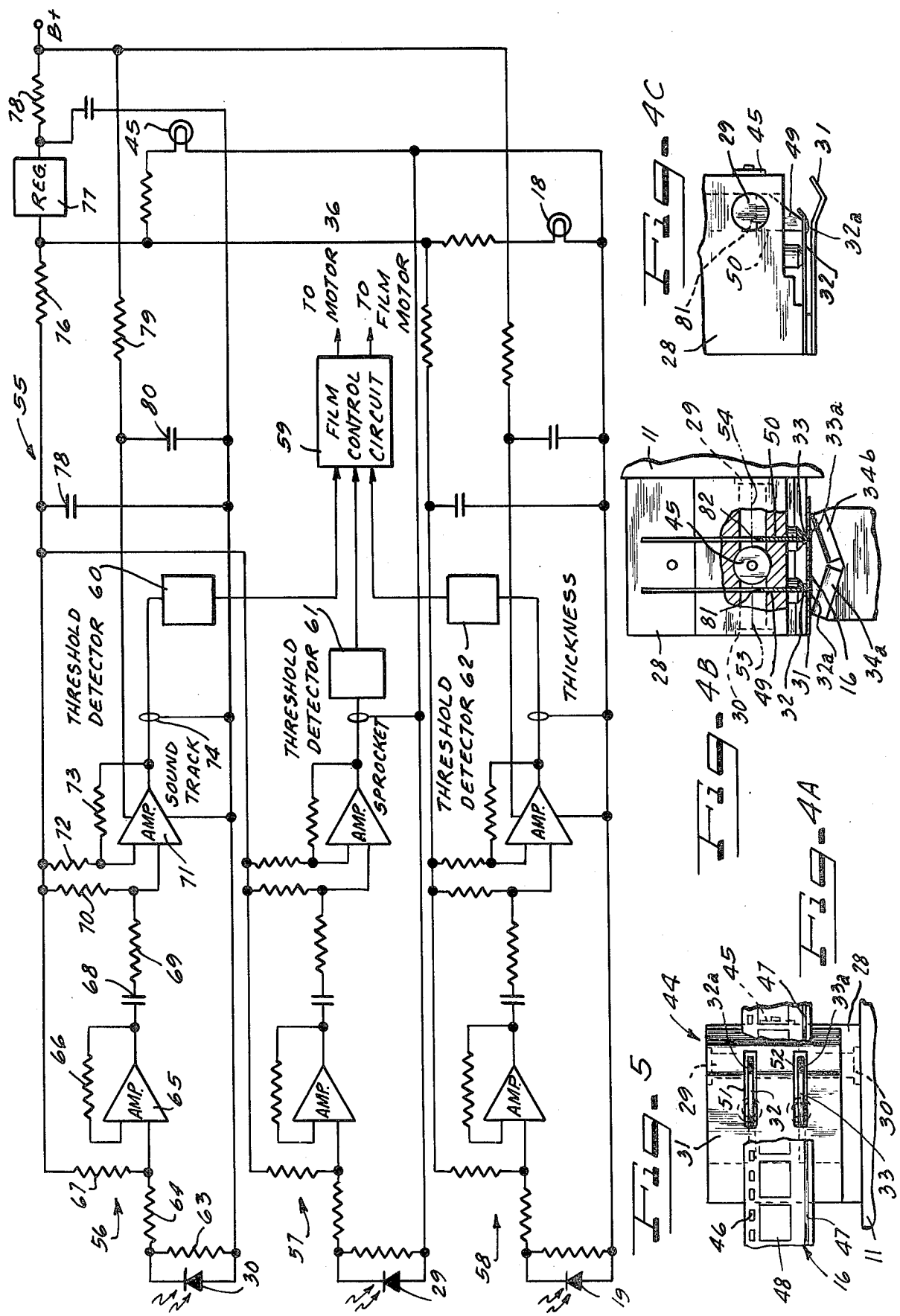

FILM THICKNESS DETECTOR

BACKGROUND OF THE INVENTION

1. Field of the Invention

This invention relates to a film thickness detector for determining thickness variations in motion picture film corresponding to splices, torn edges, burned spots or torn sprocket holes in the film.

2. Description of the Prior Art

It is desirable to detect variations in thickness of film strips due to splices, burned spots or foreign material on the film. It is also desirable to detect cut edges or torn sprocket holes. It has been proposed to use light detector systems for determining the thickness of a film strip by use of a light beam which is tangent to a portion of the film surface and parallel with the longitudinal axis of the film strip. With such a system, however, the thickness of only a narrow central portion of the film strip is measured. Furthermore, it is difficult to provide an apparatus which can clean the light detector transmission and reception elements with such a longitudinal arrangement.

It has also been proposed to provide a light source directed toward a surface of a film strip such that a light beam will be reflected off the surface and received by a light detector. Such a system will not measure the thickness of film, but only discontinuities in the film which disperse the light beam.

SUMMARY OF THE INVENTION

It is an object of this invention to provide a thickness detector using light beams in which a large portion of the film surface is exposed to the light beam for the detection of film thickness.

It is a further object of this invention to provide a light beam which is positioned at a horizontal angle with respect to the longitudinal axis of the film strip in order to facilitate cleaning of the light detector and transmission elements.

The film thickness detector system of this invention utilizes first and second thickness detector positions. The first thickness detector position has a light source for projecting the light beam which is received by a light detector. A guide roller mounted on a movable arm positions a film strip such that the light beam is tangent to a portion of the film strip which is in contact with the guide roller. The light source and light detector are positioned on opposite sides of the film strip and are oriented such that an acute angle is formed between the light beam and the longitudinal axis of the film strip. Since the film strip intercepts a portion of the light beam, variations in the thickness of the film strip correspond to variations in the light detector output. These variations are amplified and used to control indicator devices and/or film drive motors.

The second thickness detector position has a light source for projecting a light beam and at least one light detector positioned to receive the light beam. Guide means are provided to position the film strip adjacent the light beam. A sensing member is provided which rides on the surface of the film strip and is sensitive to thickness changes. This sensing member connects with an opaque flag-shaped member having an edge portion which intersects a portion of the light beam. As the sensing member follows variations in film thickness, the edge of the opaque member changes the amount of light received by the light detector and consequently the light detector output is responsive to thickness variations in the film strip. The output of this light detector is also fed to a control means for activating indicator devices and/or film drive motors. Two such sensing members may be provided, one positioned to ride over sprocket holes to detect tears and the other positioned between the sound track and picture frames.

BRIEF DESCRIPTION OF THE DRAWINGS

FIG. 1 is a front view of the film thickness detector system of this invention;

FIG. 2 is a side view of the film thickness detector system of FIG. 1;

FIGS. 3a, b, c are enlarged top, front and side views of a first thickness detector position in the system of FIG. 1;

FIGS. 4a, b, c are enlarged bottom, side and front views of the second film thickness detector position of the system of FIG. 1; and FIG. 5 is a combined schematic and block diagram of the control circuitry connected to the first and second detector positions illustrated in FIG. 1.

DESCRIPTION OF THE PREFERRED EMBODIMENTS

As shown in FIG. 1, a film thickness detector 10 has first and second thickness detector positions 8 and 9 arranged on a mounting plate 11. A film strip 16 to be analyzed is guided through the positions 8 and 9 via first, second and third guide rollers 12, 13 and 14 together with detector roller 15. By analyzing film thickness, a torn sprocket hole, splices and thickness changes produced by burns, for example, may be detected.

The first thickness detector position 8 has a thickness detector assembly 40 enclosed within a casing 17. A light source 18 is mounted by a bracket 18a adjacent an outer wall of the casing 17. The light source 18 may be either an incandescent lamp such as a G.E. sub-miniature lamp, No. 715 rated at 5 volts and 0.115 amps. Alternatively, the light source may be a light emitting diode. A thickness detector 19 such as a photocell or phototransistor is mounted adjacent an inner wall of the casing 17. The detector 19 is preferably a silicon photocell such as that manufactured by Vatac Corporation and is preferably mounted on a ceramic header. The detector roller 15 positions the film 16 so as to intersect a light beam passing between the source 18 and detector 19. Roller 15 is mounted on a movable arm 20 shown in the engaged position and shown in dotted lines as 20' in the open position.

A cell cleaning brush or wiping member 21 and a light source cleaning brush or wiping member 22 are mounted on the end of the movable arm 20 adjacent the roller 15 by use of brackets 23 and 24. Movable arm 20 is pivotably attached to the mounting plate 11 by a hinge pin 27. A slot 26 provided in the mounting plate 11 allows a pin member 25 connected at a central portion of the arm 20 to be connected to a driving system behind the plate 11. A stop pin 83 establishes the engaged position of the movable arm 20 and consequently also determines the position of the detector roller 15 adjacent the light source 18 and detector 19. As the arm 20 pivots the roller 15 towards the light source 18 and detector 19, the wiping members clean the light source 18 and detector 19.

The second thickness detector position 9 has a housing 28 within which a sprocket thickness detector 29 and sound track thickness detector 30 are mounted. Attached directly below the housing 28 is an arm protector plate 31 which cooperates with a jeweled saddle 34 on a mounting bracket 35 positioned on the movable arm 20. When the movable arm 20 is in the engaged position, the film 16 resting in the jeweled saddle 34 is positioned adjacent arm protector plate 31. A sprocket detecting arm 32 and sound track detecting arm 33 extend through apertures 51, 52 in the arm protector plate 31 (FIG. 4A) when the movable arm 20 is in the engaged position.

As shown in FIG. 2, the jeweled saddle 34 on the mounting bracket 35 is formed by jeweled cylinders 34a, 34b joined to form a V-shaped saddle. A motor 36 is also shown in FIG. 2 which is spaced from the plate 11 by a supporting spacer 37 and gear box 38. Control circuitry 55 is enclosed within a box 39.

As shown most clearly in FIGS. 3a, b, c the thickness detector assembly 40 is formed of the detector roller 15 functioning as a guide means for guiding the film along a curved path, film 16 riding on the detector roller 15, and lamp 18 and detector 19 with a light beam 41 therebetween. This light beam 41 is tangent to the film 16 at a portion 43. This tangent portion causes a shadow on the detector which causes less current to flow therein. As the film strip thickness varies, the amount of shadow changes in correspondence therewith such that a current variation is obtained in the detector 19. The light beam 41 is preferably angled with respect to the longitudinal axis of the film 16 so that a tear 42 in the edge of the film, for example, will not interfere with the thickness measurement of the film 16. In a preferred form of the invention, the angle between the light beam and the longitudinal axis of the film strip is about 30°.

As shown in FIGS. 1 and 4a, b, c, a sound track and sprocket detector assembly 44 is shown having a sprocket light receiving detector 29 and sound track light receiving detector 30. A light source 45 is positioned between detectors 29 and 30 so as to cast a light beam in opposite directions towards these detectors. The detectors and light source are components similar to those in the first detecting position described above. As shown in FIG. 4a, the film strip 16 typically has a sprocket column 46, a sound track 47 and a picture frame column 48. A sprocket detector arm 32 having a feeler member 32a which is longer than a typical sprocket hole is positioned over the sprocket column 46. When a torn sprocket hole is encountered which elongates the sprocket hole, the sprocket detection arm drops into the hole, thus signalling a thickness change. A sound track thickness detector arm 33 having a feeler member 33a is positioned between the sound track 47 and picture frame column 48.

As shown most clearly in FIGS. 4b and 4c, flag-like opaque members 49 and 50, respectively mounted on detector arms 32 and 33 have upper edge portions 81 and 82 which intercept light rays 53 and 54, respectively. As the film 16 rides in the jeweled saddle formed by the jewels 34a and 34b, the opaque members 49 and 50 deflect in correspondence with thickness variations so that the portion of the light beam which is received at the light detectors 29 and 30 varies so as to produce a varying current corresponding with thickness changes of the film. Specifically, as a sprocket tear occurs, the detecting arm 32 drops into the sprocket hole and a thickness change is signaled. Similarly, if a thickness change occurs adjacent to the sound channel, the detector arm 33 signals such a change.

As shown in FIG. 5, the control circuitry 55 for the thickness detector system of this invention is formed of three amplifier chain channels 56, 57 and 58. These respectively correspond to the sound track detector 30, sprocket detector 29 and thickness detector 19. Each of these amplifier chains is connected through individual threshold detectors 60, 61 and 62 to a control circuit 59. The threshold detectors 60, 61 and 62 detect when the signal variations from the respective channels exceed a preset value. When this occurs, an output is delivered to the film control circuit which may perform any one of a number of functions depending upon the intended use. For example, the control circuit 59 may activate an indicator means such as an alarm light or buzzer and at the same time may disrupt power to a film motor transporting the film strip. Additionally, the film control circuit 59 may supply power to the motor 36 which connects through a gear box 38 and a coupling (not shown) to move the pin 25 and cause the movable arm member 20 to swing the roller 15 into or out of the first thickness detector position 8 and the jeweled saddle 34 into or out of the second thickness detector position 9. The circuitry for the threshold detectors 60, 61, 62 or the film control circuit 59 can assume a variety of forms as is well known to those skilled in the art and consequently such circuitry is not shown. For example, the threshold detector 60 may incorporate a plurality of series connected diodes to set a desired threshold value for triggering a transistor switch. Similarly, the control circuit may employ relays or transistor switches for control.

Since each of the amplifier chains 56, 57 and 58 are similar, only one of such chains, namely the sound track chain 56 will be described.

In the sound track amplifier chain 56, light variations received by the detecting photocell 30 are connected through a resistor 64 to a first input of an integrated circuit operational amplifier 65. A resistor 63 is connected in parallel across the photocell 30. A feedback resistor 66 connects an output of the operational amplifier 65 to a second input thereof. Bias is supplied to the first input via a resistor 67. A coupling capacitor 68 and series connected resistor 69 couple the output of the amplifier 65 to a first input of another integrated circuit operational amplifier 71. A resistor 70 provides bias to the first input of the amplifier 71 and a resistor 72 provides bias to a second input of the amplifier 71. The resistor 73 provides feedback from an output of the amplifier 71 to the second input. The output connects via a coaxial cable 74 through a threshold detector 60 to the film control circuit 59.

Variations in the thickness of the film strip adjacent the sound track are detected by the photocell 30 and are amplified through the operational amplifiers 65 and 71. When the voltage variation exceeds a predetermined threshold, the threshold detector 60 activates the film control circuit 59.

Power for the three amplifiers is supplied from a B+ point through a resistor 78 and appropriate filter capacitors. A regulator 77 and dropping resistors 76 are also provided. Furthermore, an unregulated voltage is applied to the integrated circuit operational amplifiers via a filter section formed of resistor 79 and capacitor 80. Light sources 18 and 45 for the detectors 30, 29 and 19 are connected after the regulator 77 via dropping resistors.

Operation of the sound track channel has been explained above. Operation of the sprocket channels and thickness channels 57 and 58 are similar. In the sprocket channel, when the sensing arm causes light variation in the detector 29 due to the drop in of the sensing arm into torn sprocket holes, such variations are amplified and presented to the threshold detector 61. When a voltage variation exceeds a predetermined value established in the detector 61, the control circuit 59 is activated. Similarly, with the thickness detector 58, when thickness variations are sensed by the tangent light beam 41 in the first detecting position 8, such variations are sensed by the photocell 19 and amplified. When such variations exceed a predetermined value established in the threshold detector 62 the control circuit is activated.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A motion picture film thickness detector system for analyzing a motion picture film strip, comprising:
   (a) first thickness detector means for monitoring thickness changes substantially along a central longitudinal axis of the motion picture film strip but not edges of the film strip, said first thickness detector means including
      (i) cylindrical guide means for guiding the film strip along a curved path;
      (ii) light source means positioned for projecting a light beam which is tangent to a portion of the film strip along said curved path, said light beam forming an angle with a longitudinal axis of said film strip at said portion of the film at which the light beam is tangent, said angle being less than 90°;
   (b) second thickness detector means for measuring sprocket hole defects along one edge of the film strip and third thickness detector means for measuring thickness variations adjacent picture frames of the film strip along the other edge of the film strip;
   (c) said second and third thickness detector means each comprising:
      (i) a sensing member riding on a surface of the film strip; and
      (ii) positioning means for positioning the film strip adjacent the sensing member; and
   (d) first, second, and third film rollers, a pivoting arm, said cylindrical guide means being positioned on said arm so as to selectively swing between the first and second rollers and position the film strip into the light beam between the first and second rollers, and the positioning means being positioned on the same arm so as to selectively swing to a position adjacent each sensing member between the second and third film rollers.

2. A film thickness detector comprising:
   (a) a light source for projecting a light beam;
   (b) a light detector positioned to receive said light beam;
   (c) a guide roller means for a film strip positioned such that the light beam is tangent to a portion of the film strip in contact with the guide roller means and such that edges of the film strip lie between and are respectively adjacent to the light source and the light detector, said film strip interrupting a portion of the light beam in correspondence with the film strip thickness;
   (d) control means connected to said light detector responsive to changes in output from said light detector corresponding to thickness variations of said film strip; and
   (e) a swingable arm means having said guide roller means mounted thereon and which further includes a pair of wiping members for cleaning the light detector and light source when the arm means moves said guide roller means towards said light beam.

3. The detector of claim 2 in which said light beam forms an angle with a longitudinal axis of said film strip at the portion of the film to which the light beam is tangent, said angle being less than 90°.

* * * * *